Sept. 10, 1968   C. T. BELL   3,401,334
VELOCITY INDICATOR FOR BOWS AND ARROWS
Filed June 16, 1966   2 Sheets-Sheet 2

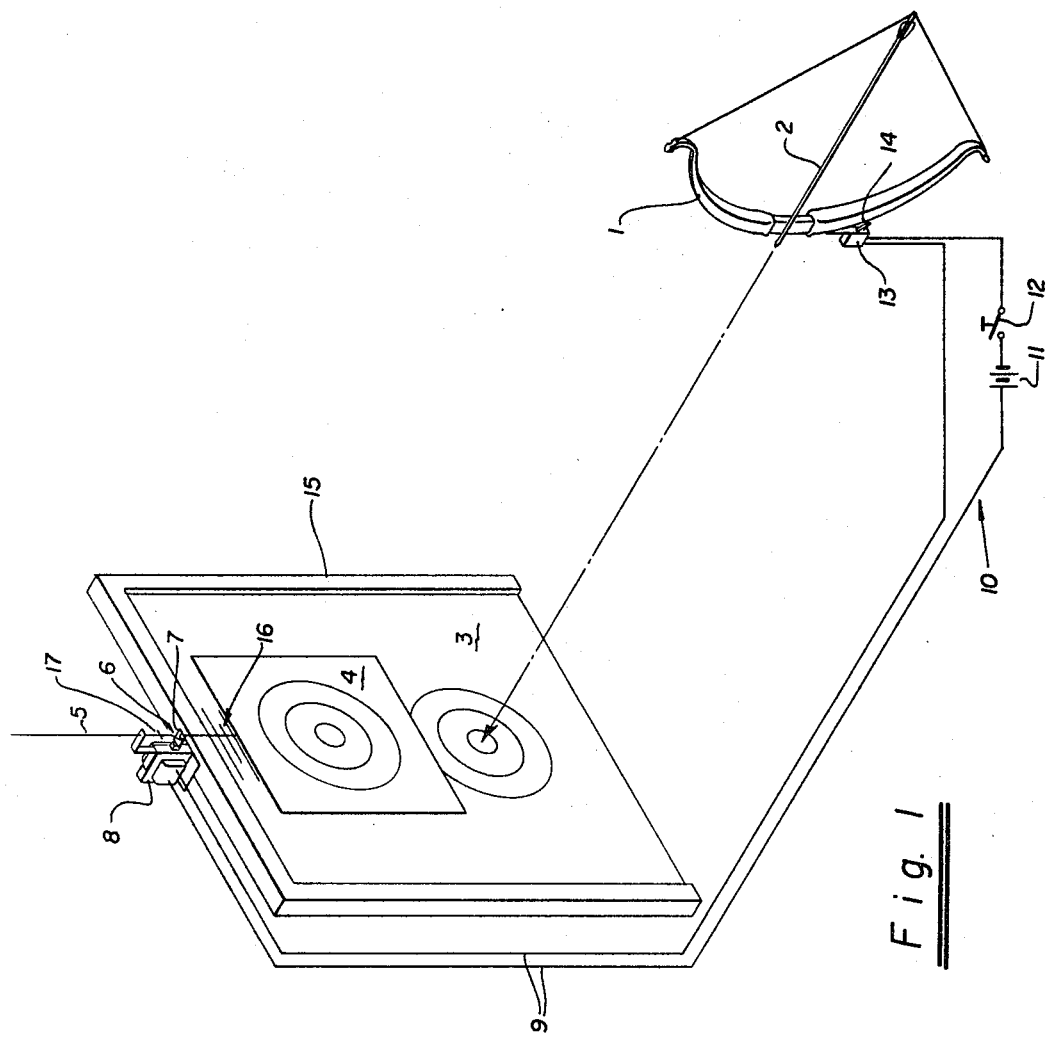

INVENTOR.
Charles T. Bell
BY *White and Quakes*
Attorneys

United States Patent Office 3,401,334
Patented Sept. 10, 1968

3,401,334
VELOCITY INDICATOR FOR BOWS AND ARROWS
Charles T. Bell, 649 Moraga Way,
Orinda, Calif. 94563
Filed June 16, 1966, Ser. No. 558,115
4 Claims. (Cl. 324—70)

My invention relates to the sport of archery and to the determination of the velocity of arrows when shot from a bow. More particularly it relates to a device which will instantaneously indicate the velocity of flight of an arrow, as an average, from the time it leaves the bow until it strikes a target a given distance away. It is thus suitable for the determination of the efficiency and effectiveness of bows of various designs and constructions and also the efficiency of arrows of different configurations.

Various devices for measuring, indicating, and recording the velocity of projectiles in flight have been in use. None of these, however, is peculiarly adapted for the purpose which I disclose herein nor do they indicate the velocity through the means and manner of my invention. Resort is usually had to somewhat complicated mechanisms and electronic devices as well as complicated mechanical mechanisms. My device, however, is relatively simple and effective and sufficiently accurate for the purpose as disclosed more fully hereinbelow.

It is therefore an object of my invention to provide a device for measuring the velocity of an arrow in flight which would be simple, compact, and easy to construct.

It is another object of my invention to provide a device for measuring the velocity of an arrow in flight which would indicate such velocity instantaneously on a graduated scale.

It is still another object of my invention to provide a device of the class described which while being simple and efficient, would provide reasonable accuracy of measurement.

I have discovered that by providing a vertically movable target suspended above a stationary target, firing an arrow from a bow from a predetermined distance of the stationary target and at the same instant releasing the suspended target, thereby causing the latter to be pinned up against the stationary target by the arrow I am able to indicate the velocity of the arrow by measurement of the amount of fall of the movable target. In fact, by providing a pointer fixedly positioned on the wire and having it move by a scale on the stationary target, I am able to graduate this scale to read the velocity directly in feet per second.

Reference should now be had to the figures in which:

FIG. 1 represents a perspective view of the complete assembly of my invention, illustrating the principle of operation.

Figure 3:
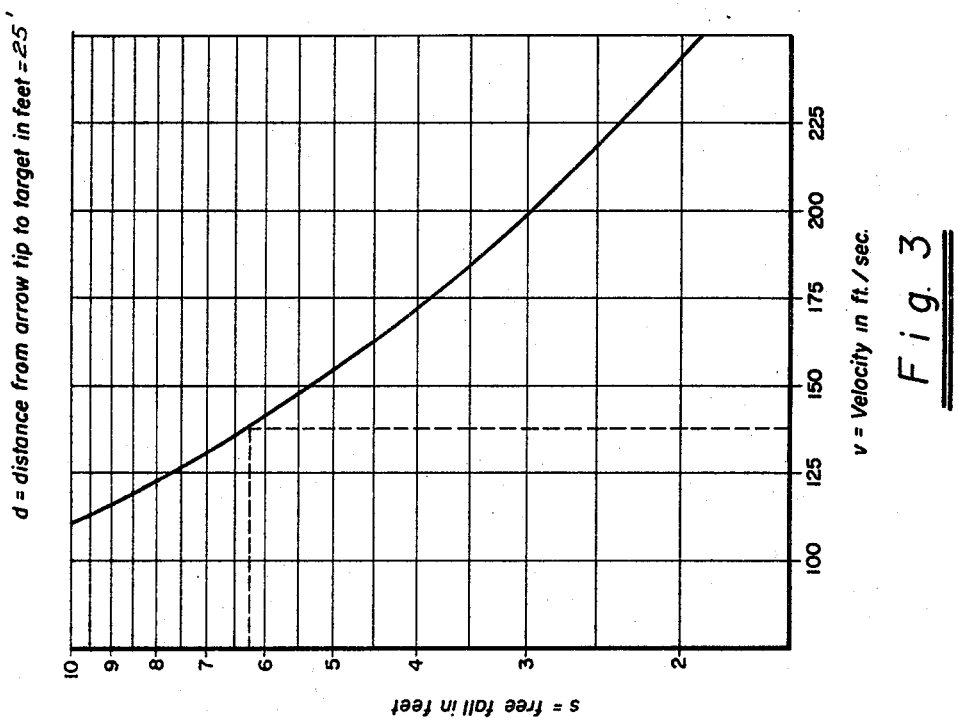
FIG. 3 is a curve illustrating the method of calculation and graduation of the velocity scale.

Referring now more particularly to FIG. 1, there is seen a bow 1, arrow 2, and stationary target 3, the latter being located a predetermined distance $d$ from the bow 1. These elements may be typical of the type ordinarily encountered in the art of archery.

Movable target 4 is suspended by means of wire guide 5 so that it may slide up and down against the surface of stationary target 3. There is a crimp or projection 6 permanently positioned on wire guide 5 which is engaged by an elecric trigger 7 which in turn is operated by electrical solenoid 8.

Electrical leads 9 connect the coil of solenoid 8 to electric circuit 10. This circuit comprises a power supply 11, a foot disconnect switch 12, and a bow switch 13. The latter is permanently positioned on the frame of bow 1 by means of clamp 14 and is disposed to be open when the bow is bent prior to firing and to close when the bow springs back at the instant the arrow is fired.

Figure 2:
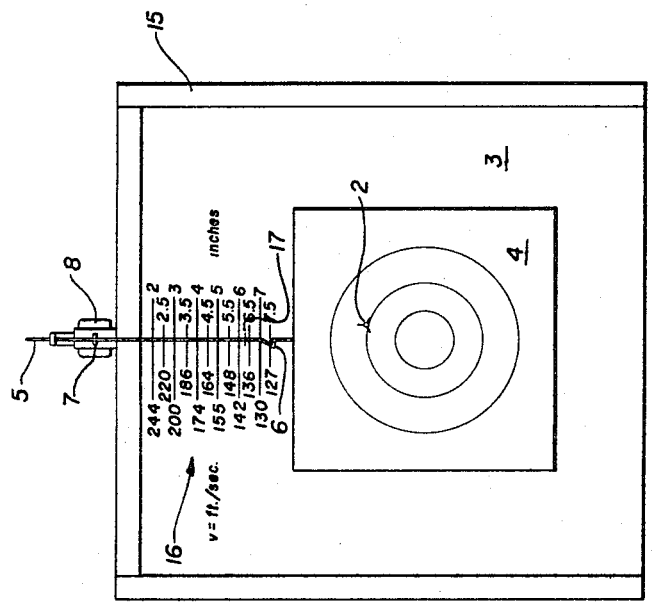
FIG. 2 is a front view of the stationary and movable targets together with the pointer and scale.

The target structure is supported by any convenient type of frame 15. A graduated scale 16 is located on the face of stationary target 3 across which moves an indicating pointer 17 which is affixed to a wire guide 5. These are located and calibrated in accordance with the calculation set forth more fully below. They are also shown more clearly in FIG. 2 and the calibration curve may be seen on FIG. 3.

Operation

The operation of my device is as follows. Movable target 4 is first raised by means of wire guide 5 until the crimp 6 is engaged by electrical trigger 7. The latter may be of a spring loaded type so disposed that when solenoid 8 is deenergized it will hold the crimp in a fixed position thereby causing movable target 4 to hang above stationary target 3. At this point, pointer 17 is disposed opposite the zero figure on scale 16.

I then station myself a predetermined distance $d$ away from and at right angles to the target 3 with my bow 1 and arrow 2. At this time, and before flexing of the bow, the bow switch 13 is closed but foot switch 12, which is of the normally open type, breaks the circuit to the coil of solenoid 8. When I get set to fire I draw back the bow 2, which opens bow switch 13. I then depress foot switch 12 by means of my foot which closes that portion of the circuit. At the instant I fire arrow 2, bow switch 13 is closed by bending of bow 1, thereby completing the circuit and energizing solenoid coil 8. This releases electric trigger 7 permitting movable target 4 to drop vertically during the period that arrow 2 is flying towards it. Its vertical fall is arrested at the instant target 4 is struck by arrow 2 and pinned against target 3.

The velocity of the arrow may then be determined by a combination of the following formulas:

$$d = vt$$
$$s = 1/2\ gt^2$$

where $d$ = distance from arrow tip to target in feet
$v$ = velocity of arrow in feet per second
$g$ = acceleration of gravity (32.2 feet per second)$^2$
$t$ = time in seconds
$s$ = space of free fall of target in feet Hence, $$v = \frac{d}{\sqrt{\frac{s}{16.1}}}$$

For a specific distance $d$, such as twenty-five feet, there will be a fixed relation between $v$ and $s$ and hence a velocity scale may be calibrated directly in feet per second. This may be seen graphically on FIG. 3 which shows that one specific drop of 6.25 inches, the arrow velocity will be 140 feet per second.

I have found that the accuracy of my device and method is plus or minus one foot per second at a velocity of approximately 200 feet per second. This I have further found to be quite adequate for all intended purposes.

While I have shown a preferred embodiment of my invention, other variations will be evident to those skilled in the art, which may be made without departing from the spirit and scope of my invention. I therefore do not limit myself to the embodiment shown, except as I do so in the claims which follow.

I claim:
1. A device for measuring the velocity of flight of an arrow shot from a bow comprising:
- a fixed vertical target positioned a predetermined distance from said bow;
- a movable target slidably mounted for vertical movement into overlying relationship to said fixed target;
- means for suspending said movable target above the center of said stationary target;
- means for releasing said movable target at the instant of firing said bow at said stationary target thereby permitting said movable target to fall by gravity into said overlying relationship until said movable target is fastened to said fixed target by said arrow;
- means for measuring the amount of vertical fall of said movable target from its initial position to its fastened position after impact by said arrow;
- whereby the velocity of said arrow may be computed,

2. The device of claim 1 in which said means for measuring said amount of vertical fall comprises:
- a direct reading vertical scale mounted on said stationary target;
- a pointer fixedly positioned with relation to said movable target and disposed to move across said vertical scale;
- said scale being so further positioned and calibrated as to indicate directly the velocity of said arrow by the position of said pointer.

3. The device of claim 1 in which said means for suspending and for releasing said movable target comprises:
- a suspension wire fixedly attached to said movable target;
- stationary latch means engaging said wire;
- an electrically operated solenoid disposed to alternately engage and disengage said latch means as said solenoid is alternately energized and deenergized;
- means for alternately energizing and deenergizing said solenoid from a source of electrical power.

4. The device of claim 3 in which said means for alternately energizing and deenergizing said solenoid from a source of electrical power comprises a first bow operated switch fixedly positioned relative to said bow and disposed to connect said source of electrical power to said solenoid when said arrow is fired; a second foot operated switch disposed to connect said source of electrical power to said solenoid when said switch is depressed and to disconnect said source of power when said switch is released; said switches, said source of power and said solenoid all being connected in series.

References Cited

UNITED STATES PATENTS

| | | | |
|---|---|---|---|
| 1,357,281 | 11/1920 | Du Pont | 324—70 |
| 1,804,450 | 5/1931 | Allen | 73—167 |
| 2,146,820 | 2/1939 | Haselwood | 324—70 |
| 2,157,572 | 5/1939 | Roberts | 324—70 |
| 2,691,415 | 10/1954 | Standal | 324—68 |

RUDOLPH V. ROLINEC, *Primary Examiner.*

M. J. LYNCH, *Assistant Examiner.*